C. D. ROUSSEAU.
AUTOMOBILE LOCK.
APPLICATION FILED MAY 23, 1919.
1,320,415.
Patented Nov. 4, 1919.
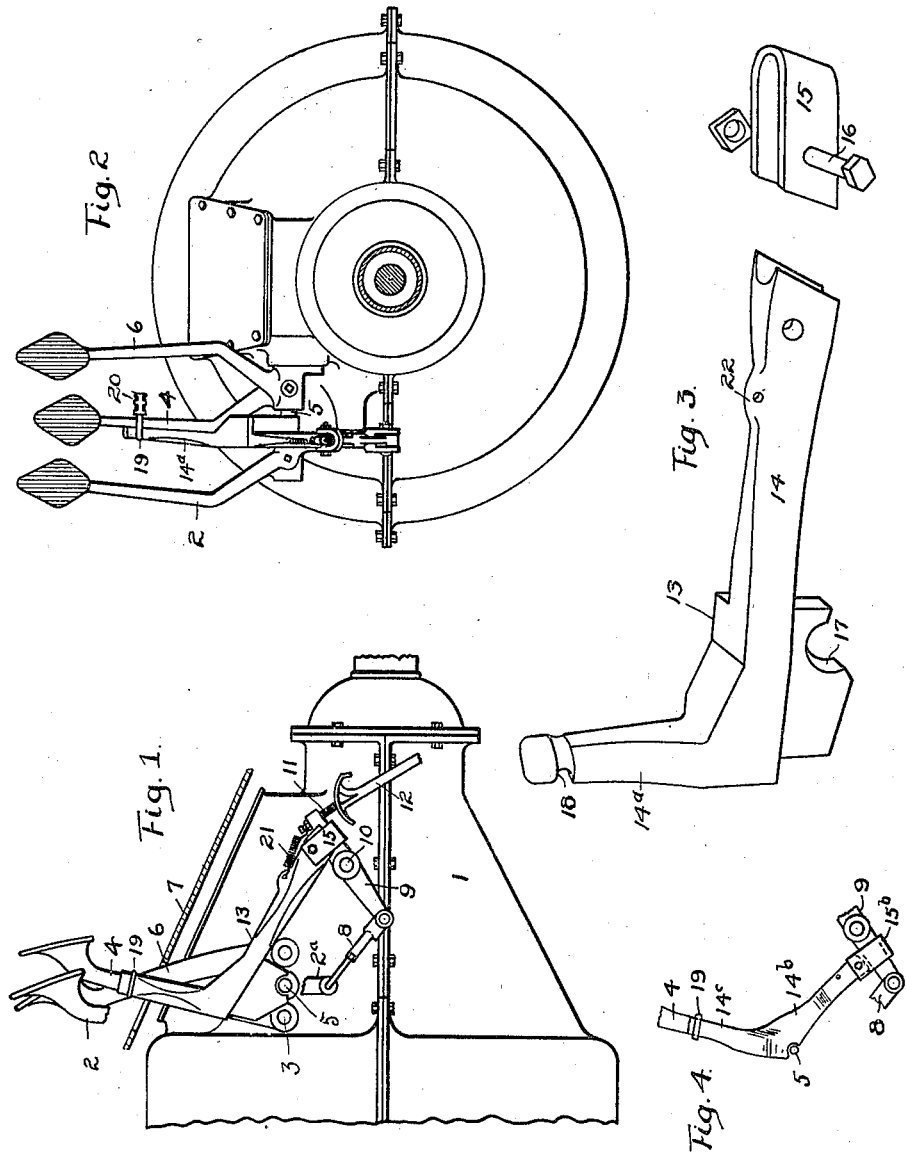
Chauncey D. Rousseau
INVENTOR
by Elwin M. Hulse
ATTORNEY

UNITED STATES PATENT OFFICE.

CHAUNCEY D. ROUSSEAU, OF NEAR FORT WAYNE, INDIANA.

AUTOMOBILE-LOCK.

1,320,415.

Specification of Letters Patent.

Patented Nov. 4, 1919.

Application filed May 23, 1919. Serial No. 299,093.

*To all whom it may concern:*

Be it known that I, CHAUNCEY D. ROUSSEAU, a citizen of the United States, residing near Fort Wayne, in the county of Allen and State of Indiana, have invented new and useful Improvements in Automobile-Locks, of which the following is a specification.

The invention relates to locks for automobiles and particularly to devices by which the transmission mechanism of such machines may be securely locked against unauthorized operation.

The object of the invention is to provide a simple, inexpensive and easily installed and operated lock which will securely lock an automobile against unauthorized operation, and in the accompanying drawings I have illustrated an adaptation of the invention to a Ford automobile, and in which drawings—

Figure 1 is a side elevational view of a portion of a Ford car having the invention applied thereto; Fig. 2 a front elevation of the same; Fig. 3 a perspective view of the locking device and Fig. 4 a modified form of the locking device in locked position.

Referring to the drawings 1 is the housing containing the transmission mechanism, 2 the speed controlling lever secured to shaft 3 carrying the slow speed gear within the housing, 4 the reverse lever secured to shaft 5 carrying the proper backing gear within the housing and 6 the brake lever. The three levers extend upwardly through suitable slots in foot board 7 of the car body and carry foot pedals as shown. The lower end $2^a$ of lever 2 is pivotally connected to link 8 pivotally connected to one end of lever 9 secured to shaft 10 carrying the high speed gear within the housing, a bolt 11 being carried in the opposite end of lever 9. The bolt is adapted to abut stop 12 pivotally mounted on housing 1, a hand operated lever, not shown, being connected to member 12 by which the member is dropped down and away from bolt 11. The parts thus far described are all old and are commonly to be found in all Ford cars of standard construction.

When the car is idle the hand lever is in vertical position and the foot pedals and levers are in the position shown in Figs. 1, 2 and 4. The speed controlling lever is then in neutral position and to start the car this lever is pushed forwardly to connect the low gear to the transmission devices and the hand lever is thrown forwardly to drop member 12. Lever 2 is then released and it swings rearwardly to rock lever 9 and shaft 10 to cause the high speed gear or clutch to connect to the transmission devices. In stopping the car lever 2 must be placed in neutral position and the hand lever is moved into vertical position to cause member 12 to rise into engagement with bolt 11, and it is the object of my invention to lock the levers in the neutral position.

The locking device 13 consists of a base portion 14 having a clevis 15 pivotally secured to one end thereof, the clevis being adapted to be engaged about the upper arm of lever 9, bolt 16 serving to pivotally secure the clevis to portion or member 14. A notch 17 is formed in the lower surface of member 14 into which the outwardly projecting end of shaft 5 is adapted to seat when the member is moved downwardly on pivot 16. The forward portion $14^a$ of member 14 is angularly disposed thereon to pass through one of the slots in foot board 7 and extend upwardly adjacent lever 4, a notch 18 being formed in the upper end of portion $14^a$ to receive bow 19 of padlock 20, the bow also straddling lever 4. Spring 21 is connected at one end to member 14 in apertured lug 22 and at its opposite end the spring is connected to bolt 11 or other convenient part of lever 9. The spring tends to lift member 14 on its pivot out of engagement with shaft 5, and when means securing the member to lever 4 is removed the spring elevates the member and permits lever 9 to be rocked by lever 2, it being apparent that when member 14 engages shaft 5 lever 9 can not be rocked to rock shaft 3 nor can lever 4 be moved to throw in the reversing gear. Both levers 2 and 4 are therefore locked until the member 14 is released and the member can not be released by one not having the proper key to the lock. Any means for securing the locking device to lever 4 will suffice provided it is such as can not be operated by any unauthorized person.

In Fig. 4 I have illustrated a slightly modified form of locking means in which member $14^b$ is pivotally connected to clevis $15^b$, the clevis being engaged about the lower arm of lever 9 instead of about the upper arm as in case of member 14 and this requiring a greater angularity of portion $14^c$ with respect to member $14^b$ than the angularity between member 14 and portion 14ª. In other respects the two locking means are similar and the effect of their operation is the same in each. In both illustrations of the invention the locking device is below the foot board of the car with the single exception of the upright portion thereof which extends alongside of lever 4 and is adapted to be attached or secured thereto by the lock or other suitable means. When locked in position it is practically impossible to remove the locking device by one not authorized.

The invention is readily adapted to other makes of cars than the Ford, the illustrations and description herein being only one such adaptation.

What I claim is:

1. The combination with a plurality of transmission shifting levers, of a rocking lever adapted to be operated by one of the shifting levers, a member pivotally connected to the rocking lever and adapted to engage one of the shifting levers and to be locked thereto and means normally disengaging the engagement of said member and said shifting lever.

2. The combination with a plurality of rotatably mounted shafts, a foot board above the shafts having slots therein, shifting levers secured to a portion of the shafts and projecting through the slots for operating or rotating the said shafts, a rocking lever secured to another of said shafts and having an operating connection with one of the shifting levers, a member pivotally connected to the rocking lever and having an upwardly extending projection adapted to be removably locked to one of the shifting levers and means normally holding the member disengaged from said shifting lever.

3. The combination with the foot-board of an automobile, of a plurality of rotatable shafts carrying suitable parts of the transmission mechanism of the automobile, levers secured to a portion of said shafts having their upper ends extending through slots in said foot-board, a rocking lever secured to another of said shafts and having an operative connection to one of the levers projecting through said foot-board, a locking member pivotally secured to the rocking lever and having a notch in its lower surface adapted to engage one of the shafts and also having an upstanding portion extending through a slot in the said foot-board, a spring normally retaining the locking member in disengagement with said shaft and means to releasably secure the upstanding portion of the locking member to one of the levers.

In witness whereof I have hereunto subscribed my name this 20th day of May, 1919.

CHAUNCEY D. ROUSSEAU.

Copies of this patent may be obtained for five cents each, by addressing the "Commissioner of Patents, Washington, D. C."